United States Patent
Young

(10) Patent No.: US 6,745,260 B1
(45) Date of Patent: Jun. 1, 2004

(54) METHOD AND SYSTEM FOR DATA STREAMING DURING THE DATA IN PHASE OF THE PACKETIZED SCSI PROTOCOL

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 486 days.

(21) Appl. No.: 09/745,037

(22) Filed: Dec. 20, 2000

(51) Int. Cl.[7] .................................................. G06F 3/00
(52) U.S. Cl. ........................... 710/36; 710/33; 710/105; 709/231; 370/389
(58) Field of Search .................. 710/5, 20, 30, 710/31, 33–36, 52, 15, 29, 73, 105; 711/4, 100, 114; 709/217, 231, 236; 712/225; 370/389

(56) References Cited

U.S. PATENT DOCUMENTS

| | | | |
|---|---|---|---|
| 5,155,735 A | 10/1992 | Nash et al. | 371/49.1 |
| 5,287,463 A | 2/1994 | Frame et al. | 395/325 |
| 5,471,634 A | 11/1995 | Giorgio et al. | 395/600 |
| 5,524,268 A * | 6/1996 | Geldman et al. | 710/5 |
| 5,619,646 A | 4/1997 | Hoch et al. | 395/200.01 |
| 5,740,466 A * | 4/1998 | Geldman et al. | 710/5 |
| 5,812,875 A | 9/1998 | Eneboe | 395/840 |
| 5,845,154 A | 12/1998 | Krakirian | 395/894 |
| 5,892,958 A * | 4/1999 | Nagashige et al. | 713/323 |
| 6,185,620 B1 | 2/2001 | Weber et al. | 709/230 |
| 6,282,584 B1 * | 8/2001 | Garroussi et al. | 710/5 |
| 6,438,128 B1 | 8/2002 | Kashyap | 370/389 |
| 6,477,165 B1 | 11/2002 | Kosco | 370/389 |
| 6,493,750 B1 * | 12/2002 | Mathew et al. | 709/220 |
| 6,493,785 B1 * | 12/2002 | Galloway | 710/314 |
| 6,542,924 B1 * | 4/2003 | Abe | 709/208 |
| 6,609,161 B1 | 8/2003 | Young | 710/5 |

OTHER PUBLICATIONS

U.S. patent application Ser. No. 09/745,105, Young, filed Dec. 20, 2000.
U.S. patent application Ser. No. 09/745,106, Young, filed Dec. 20, 2000.
U.S. patent application Ser. No. 09/745,036, Young, filed Dec. 20, 2000.
U.S. patent application Ser. No. 09/745,035, Young, filed Dec. 20, 2000.
U.S. patent application Ser. No. 09/745,034, Young, filed Dec. 20, 2000.
"Ultra160, Ultra3, Ultra320 SCSI: The Next Steps in SCSI," A White Paper, gLogic Corp,. pp. 1–20, May 11, 2000.
"More efficient command and data transfer with Packetized SCSI," IBM, pp 1–7, Nov., 1999.
"Packetized SCSI, QAS, and Bus Fairness," White Paper, 9 pages, Nov. 7, 2000.

* cited by examiner

*Primary Examiner*—Jeffrey Gaffin
*Assistant Examiner*—Rijue Mai
(74) *Attorney, Agent, or Firm*—Gunnison, McKay & Hodgson, L.L.P.; Forrest Gunnison

(57) ABSTRACT

A method for data streaming by a SCSI system using a Packetized SCSI Protocol includes transferring a data packet information unit in a Packetized SCSI Protocol Data In phase between a SCSI target and a SCSI initiator over a SCSI bus. In this method, the SCSI target generates a signal on the SCSI bus in the Packetized SCSI Protocol Data In phase to indicate whether a header packet information unit or another data packet information unit is to be transmitted next in the Packetized SCSI Protocol Data In phase to the SCSI initiator.

11 Claims, 5 Drawing Sheets

METHOD AND SYSTEM FOR DATA STREAMING DURING THE DATA IN PHASE OF THE PACKETIZED SCSI PROTOCOL

BACKGROUND OF THE INVENTION

1. Field of the Invention

The present invention relates generally to data transfers over an I/O bus, and more particularly, to Packetized SCSI Protocol Data transfers.

2. Description of Related Art

Prior to the Packetized SCSI Protocol, the SCSI Protocol utilized the well-known SCSI bus phases, Message Out, Message In, Command, Data Out, Data In, and Status to exchange information and data between a SCSI initiator and a SCSI target over a SCSI bus. Performance improvements throughout the revisions of the SCSI Protocol have been primarily in the data phases. Consequently, information can be transferred between the SCSI initiator and the SCSI target at a very much higher rate in the data phases than in any of the other SCSI phases.

To capitalize on the higher data throughput during the SCSI data phases, the Packetized SCSI Protocol specifies that all information exchanged between a SCSI initiator and a SCSI target is done via packets, called information units (IU), in either the Data In or the Data Out phases exclusively. Originally, each data packet, referred to herein as a data packet information unit, was immediately preceded by a header packet, referred to herein as a header packet information unit. The header packet information unit contained information about the immediately following data packet information unit, such as the length of the data packet information unit.

According to the Packetized SCSI Protocol, data transfers from a SCSI initiator, sometimes referred to as initiator, to a SCSI target, sometimes referred to as target, were initiated by the target transferring a header packet information unit to the initiator via the Data In phase. The header packet information unit was basically a request by the target for the initiator to fetch data from the host for transfer to the target. After sending the header packet information unit, the target switched the SCSI bus phase to Data Out and awaited the data.

Data transfers from the target to the initiator were also initiated by the target transferring a header packet information unit to the initiator via the Data In phase. This header packet information unit basically was a request by the target for the initiator to prepare the initiator's data path for transfer of data from the target to the host system. After sending the header packet information unit, the target remained in the SCSI bus phase Data In and immediately after sending the header packet information unit could start transferring data to the initiator.

The target sometimes broke a data transfer up into multiple data packet information units, for example, to facilitate target buffer management. For example, at the beginning of a 16 Kbytes data transfer from the initiator to the target, the target may have had only 4 Kbytes of buffer space available to receive data. In this case, the target first transferred a header packet information unit in the Data In phase that specified a data packet information unit length of 4 Kbytes, and then changed the SCSI bus phase to Data Out to receive the 4 Kbytes of data from the initiator.

During the transfer of the data packet information unit, the target may have realized that another 4 Kbytes of buffer space had become available to receive data. At the end of the first 4 Kbytes data packet information unit, the target changed the SCSI bus phase back to Data In, and sent the initiator another header information packet unit requesting another 4 Kbytes of data, and then changed the SCSI bus phase back to Data Out to receive more data.

Similarly, a target could break data transfers from the target to the initiator up into multiple data packet information units with each data packet information unit preceded by a header packet information unit. In this case, the target kept the SCSI bus phase in Data In throughout the transfers.

The transfer of each header packet information unit is purely administrative overhead, and so consumes SCSI bus bandwidth. Likewise, switches between the Data In and Data Out SCSI bus phases are very costly in time. Since performance could be significantly improved by reducing the number of header packet information units and the number of SCSI bus phase changes, the Packetized SCSI Protocol incorporated data streaming.

Data streaming in the Packetized SCSI Protocol is representing multiple data packet information units using a single header packet information unit. Unfortunately, this data streaming is applicable only for data transfers from the initiator to the target. As described above, without streaming, the initiator always expected the target to change the SCSI bus phase to Data In after receiving a data packet information unit in the Data Out phase.

With data streaming, a target signals a data streaming request by remaining in the Data Out phase after receiving a data packet information unit. This signal tells the initiator to reuse the header packet information unit previously received from the initiator to transfer another data packet information unit to the target. This data-streaming scheme eliminated transfer of header packet information units between data packet information units in some situations, and also eliminated the associated SCSI bus phase changes from Data Out to Data In and back to Data Out for transfers from the initiator to the target.

According to the Packetized SCSI Protocol, there is no data streaming for data transfers from the target to the initiator. While several schemes have been proposed for streaming in this direction, all had poor performance and so were not adopted.

While the Packetized SCSI Protocol data streaming does reduce overhead for transfers in one direction, the data streaming does not provide the initiator any information that helps in prefetching data from the host. To maximize performance, the initiator must always have data in its data path. If the initiator waited for a request for data from a target before requesting data from the host, a very large delay would be incurred on the SCSI bus. To eliminate this delay, the initiator assumed data streaming to the target.

Although the initiator anticipated the end of a data packet information unit based upon the length, the initiator prefetched additional data from the host to be ready in the event that the target signaled a request for another data packet information unit. If the target failed to signal such a request, the prefetched data was wasted, and would have to be fetched again. Consequently, the host bus utilization was affected by the wasted prefetching and refetching. Thus, while data streaming did eliminate some SCSI bus overhead, it did not address optimizing system performance including host bus utilization.

SUMMARY OF THE INVENTION

According to the principles of this invention, the Packetized SCSI Protocol is extended to facilitate bi-directional data streaming, e.g., streaming from an initiator to a target, and streaming from a target to an initiator, while facilitating improved host input/output (I/O) bus and initiator utilization. In one embodiment of the invention, a method for a SCSI target to support data streaming during the Data In Phase of the Packetized SCSI Protocol transmits a data packet information unit in the Packetized SCSI Protocol Data In phase. The SCSI target also generates a signal during the Packetized SCSI Protocol Data In phase to indicate whether a header packet information unit or another data packet information unit is to be transmitted next in the Packetized SCSI Protocol Data In phase. Generating the signal comprises either holding the signal in a first state or asserting a signal so that the signal goes to a second state different from the first state.

In one embodiment, the SCSI target device generates the signal by driving a signal for a parity signal line of a SCSI bus. In this embodiment, the SCSI target device asserts the signal to indicate the header packet information unit is to be transmitted next in the Packetized SCSI Protocol Data In phase.

Hence, with this method, the SCSI target device transmits a header packet information unit in the Packetized SCSI Protocol Data In phase, and then transmits a plurality of data packet information units, one immediately after another in the Packetized SCSI Protocol Data In phase. The SCSI target device asserts a signal for a SCSI bus line during the Packetized SCSI Protocol Data In phase to indicate transmission of another header packet information unit in the Packetized SCSI Protocol Data In phase. Hence, the SCSI target device supports data streaming in the Data In phase of the Packetized SCSI Protocol.

Hence, in this embodiment of the invention, a SCSI target device includes a target read streaming module configured to perform a method comprising:

transmitting a data packet information unit in a Packetized SCSI Protocol Data In phase; and generating a signal during the Packetized SCSI Protocol Data In phase to indicate whether a header packet information unit or another data packet information unit is to be transmitted next in the Packetized SCSI Protocol Data In phase.

In another embodiment, the SCSI target device includes a target read streaming module configured to perform a method comprising:

entering a Packetized SCSI Protocol Data In phase;

transmitting a header packet information unit in the Packetized SCSI Protocol Data In phase;

transmitting a data packet information unit in the Packetized SCSI Protocol Data In phase;

determining whether to transmit another header packet information unit in the Packetized SCSI Protocol Data In phase; and asserting a signal for a SCSI bus line, during the Packetized SCSI Protocol Data In phase, to indicate transmission of another header packet information unit in the Packetized SCSI Protocol Data In phase upon determining to transmit another header packet information unit.

Still another feature of this invention is a method and structure for supporting data streaming by a SCSI initiator during the Data In phase of the Packetized SCSI Protocol. In one embodiment of this method, the SCSI initiator receives a data packet information unit in the Packetized SCSI Protocol Data In phase. The SCSI initiator also receives a signal in the Packetized SCSI Protocol Data In phase to indicate whether a header packet information unit or another data packet information unit is to be received next in the Packetized SCSI Protocol Data In phase.

In one embodiment, the SCSI initiator receives the signal from a parity signal line of a SCSI bus. The SCSI initiator interprets an asserted signal to indicate the header packet information unit is to be received next in the Packetized SCSI Protocol Data In phase in this embodiment.

Hence, with this method, the SCSI initiator receives a header packet information unit in the Packetized SCSI Protocol Data In phase, and then receives a plurality of data packet information units, one immediately after another. The SCSI initiator determines whether a signal on a SCSI bus line has been asserted during the Packetized SCSI Protocol Data In phase to indicate transmission of another header packet information unit in the Packetized SCSI Protocol Data In phase following transmission of the plurality of data packet information units. The SCSI initiator receives the another header packet information unit in the Packetized SCSI Protocol Data In phase upon determining the signal has been asserted. Thus, the SCSI initiator supports data streaming in the Packetized SCSI Protocol Data In Hence, in this feature of the invention, a SCSI initiator device includes an initiator read streaming module configured to perform a method comprising:

receiving a data packet information unit in a Packetized SCSI Protocol Data In phase;

receiving a signal by the SCSI initiator in the Packetized SCSI Protocol Data In phase to indicate whether a header packet information unit or another data packet information unit is to be received next in the Packetized SCSI Protocol Data In phase; and interpreting an asserted signal to indicate the header packet information unit is to be received next in the Packetized SCSI Protocol Data In phase.

Still another feature of this invention includes a method and system for data streaming during the Data In Phase of the Packetized SCSI Protocol. According to one embodiment of this method a data packet information unit is transferred in a Packetized SCSI Protocol Data In phase between a SCSI target and a SCSI initiator over a SCSI bus. Also, a signal is generated on the SCSI bus by the SCSI target in the Packetized SCSI Protocol Data In phase to indicate whether a header packet information unit or another data packet information unit is to be transmitted next in the Packetized SCSI Protocol Data In phase to the SCSI initiator.

Hence, with this system, a header packet information unit is transferred from the SCSI target to the SCSI initiator in the Packetized SCSI Protocol Data In phase and then a plurality of data packet information units are transferred, one immediately after another, from the SCSI target to the SCSI initiator in the Packetized SCSI Protocol Data In phase. A signal is generated on a SCSI bus line by the SCSI target during the Packetized SCSI Protocol Data In phase to indicate transmission of another header packet information unit in the Packetized SCSI Protocol Data IN phase to the SCSI initiator. Hence, this system performs data streaming.

With this feature of the invention, a SCSI system includes a SCSI bus; a SCSI target connected to the SCSI bus, where the SCSI target includes a target read streaming module configured to perform a method comprising:

transmitting a data packet information unit over the SCSI bus in a Packetized SCSI Protocol Data In phase; and generating a streaming signal on the SCSI bus during the Packetized SCSI Protocol Data In phase to indicate whether a header packet information unit or another data packet information unit is to be transmitted next in the Packetized SCSI Protocol Data In phase; and a SCSI initiator connected to the SCSI bus, where the SCSI initiator includes an initiator read streaming module configured to perform a method comprising:

receiving the data packet information unit from the SCSI bus in a Packetized SCSI Protocol Data In phase by the SCSI initiator;

receiving the streaming signal on the SCSI bus in the Packetized SCSI Protocol Data In phase indicating whether a header packet information unit or another data packet information unit is to be received next in the Packetized SCSI Protocol Data In phase; and interpreting an asserted signal to indicate the header packet information unit is to be received next in the Packetized SCSI Protocol Data In phase.

The above features of the invention facilitated data streaming in the Data In phase of the Packetized SCSI Protocol. Other features of this invention, enhance utilization of a SCSI initiator in the Data Out Phase of the Packetized SCSI protocol. One of these features is a method and structure for supporting flow control by a SCSI target during the Data Out phase of the Packetized SCSI Protocol.

In one embodiment, a SCSI target receives a data packet information unit in a Packetized SCSI Protocol Data Out phase. The SCSI target generates a signal during the Packetized SCSI Protocol Data Out phase to indicate whether another data packet information unit is to be transmitted next in the Packetized SCSI Protocol Data Out phase. Generating the signal comprises either holding the signal in a first state or asserting a signal so that the signal goes to a second state different from the first state.

In one embodiment, generating the signal includes driving a signal for a parity signal line of a SCSI bus. For example, the SCSI target asserts a signal to indicate that the another data packet information unit is not to be transmitted in the Packetized SCSI Protocol Data Out phase. Hence, with this method, the SCSI target enters a Packetized SCSI Protocol Data Out and supplies a signal on a parity bit line of a SCSI bus line during the SCSI Protocol Data Out phase to indicate whether another data packet information unit is to be transmitted next.

With this embodiment, a SCSI target device includes a flow control module configured to perform a method comprising:

receiving a data packet information unit in a Packetized SCSI Protocol Data Out phase; and generating a signal during the Packetized SCSI Protocol Data Out phase to indicate whether another data packet information unit is to be transmitted next in the Packetized SCSI Protocol Data Out phase.

Another feature of this portion of the invention is a method and structure for supporting flow control by a SCSI initiator during the Data Out phase of the Packetized SCSI protocol. In this embodiment, a SCSI initiator transmits a data packet information unit in a Packetized SCSI Protocol Data Out phase by the SCSI initiator. The SCSI initiator also receives a signal in the Packetized SCSI Protocol Data Out phase indicating whether another data packet information unit is to be transmitted next in the Packetized SCSI Protocol Data Out phase.

Hence, with this method, the SCSI initiator transmits a plurality of data packet information units, one immediately after another, in the Packetized SCSI Protocol Data Out phase. The SCSI initiator also monitors a signal level on a parity line of a SCSI bus to determine whether the transmitting a plurality of data packet information units is to be terminated.

In this embodiment, a SCSI initiator device includes a flow control module configured to perform a method comprising:

transmitting a data packet information unit in a Packetized SCSI Protocol Data Out phase;

monitoring a signal on a parity bit line of a SCSI bus in the Packetized SCSI Protocol Data Out phase to determine whether another data packet information unit is to be transmitted in the Packetized SCSI Protocol Data Out phase; and interpreting an asserted signal to indicate the another data packet information unit is not to be transmitted in the Packetized SCSI Protocol Data Out phase.

Still another feature of this portion of the invention is a method and system for flow control during the Data Out phase of the Packetized SCSI Protocol. In this method a data packet information unit is transferred in a Packetized SCSI Protocol Data Out phase between a SCSI initiator and a SCSI target over a SCSI bus. Also, the SCSI target generates a signal on the SCSI bus by the SCSI target in the Packetized SCSI Protocol Data Out phase to indicate whether another data packet information unit is to be accepted in the Packetized SCSI Protocol Data Out phase by the SCSI Target. In one embodiment, the SCSI target generates the signal on a parity signal line of the SCSI bus.

Thus, in this embodiment, a SCSI system includes a SCSI bus; a SCSI target connected to the SCSI bus, the SCSI target comprising a target flow control module configured to perform a method comprising:

receiving a data packet information unit over the SCSI bus in a Packetized SCSI Protocol Data Out phase; and generating a flow control signal on the SCSI bus during the Packetized SCSI Protocol Data Out phase to indicate whether another data packet information unit is to be transmitted next in the Packetized SCSI Protocol Data Out phase; and a SCSI initiator connected to the SCSI bus, the SCSI initiator comprising an initiator flow control module configured to perform a method comprising:

transmitting the data packet information unit from the SCSI bus in a Packetized SCSI Protocol Data Out phase;

receiving the flow control signal on the SCSI bus in the Packetized SCSI Protocol Data Out phase indicating whether another data packet information unit is to be transmitted next in the Packetized SCSI Protocol Data Out phase by the SCSI initiator; and interpreting an asserted signal to indicate that another data packet information unit is not to be transmitted in the Packetized SCSI Protocol Data Out phase.

BRIEF DESCRIPTION OF THE DRAWINGS

In the drawings and the following detailed description, elements with the same reference numeral are the same element. Also, the first digit of a reference numeral for an element indicates the first drawing in which that element appeared.

DETAILED DESCRIPTION

Figure 1:
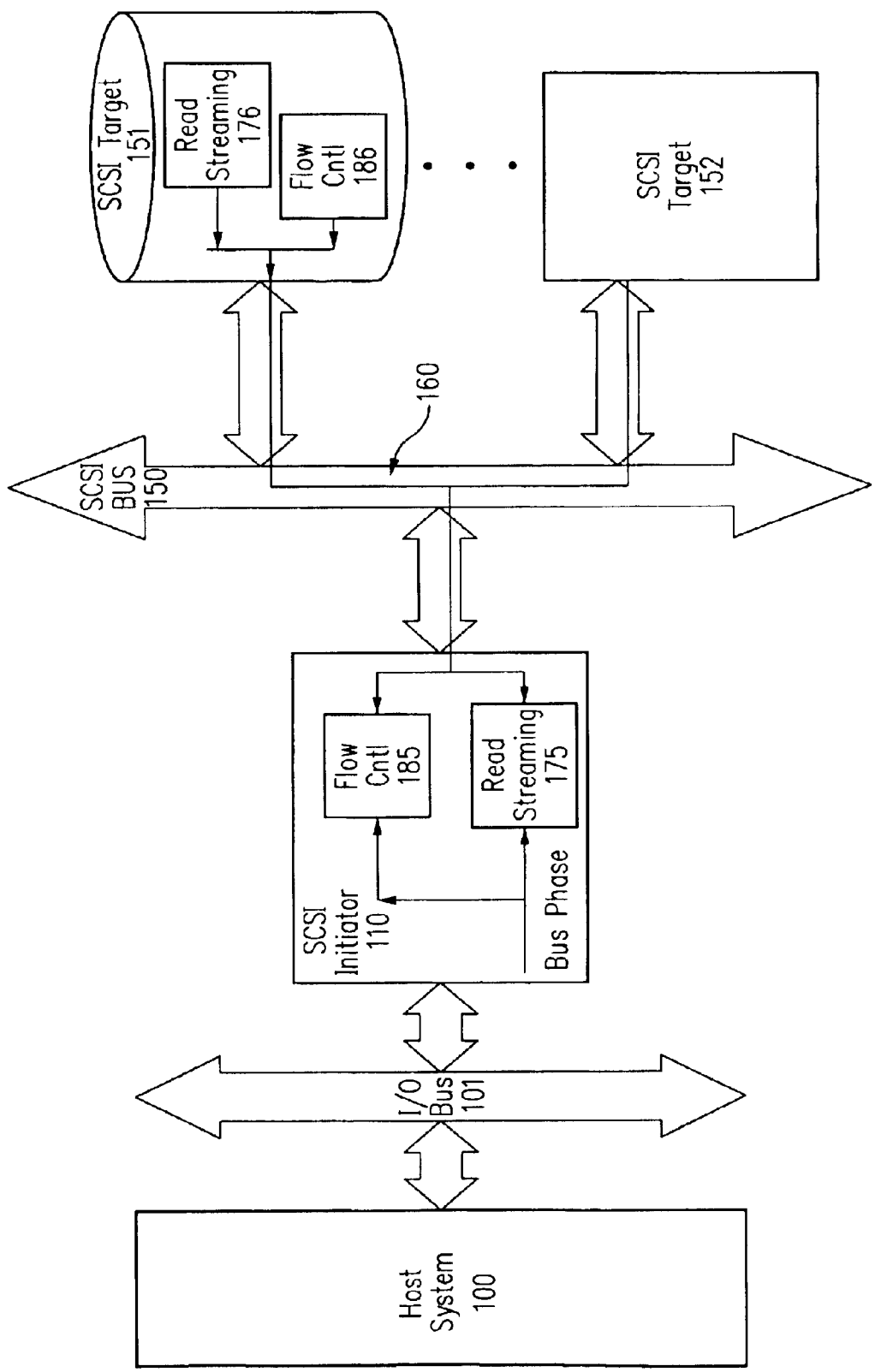
FIG. 1 is a diagram of one embodiment of the SCSI target, SCSI initiator, and SCSI system that supports flow control and data streaming according to the principles of this invention.

According to the principles of this invention, the Packetized SCSI Protocol is extended to facilitate bi-directional data streaming, e.g., streaming from an initiator to a target, and streaming from a target to an initiator, while facilitating improved host input/output (I/O) bus and initiator utilization.

As explained more completely below, in a Packetized SCSI read data transfer, e.g., a data transfer from a SCSI target, e.g., SCSI target 151 or SCSI target 152, to a SCSI initiator 110, the SCSI target asserts one of an active and an inactive data streaming signal on a line 160 of SCSI bus 150 during the transfer of a data packet information unit to initiator 110. Consequently, when initiator 110 receives the complete data packet information unit and the SCSI bus phase remains Data In, initiator 110 samples the data streaming signal on line 160 to determine whether the target is transmitting a new header packet information unit, or whether the target is sending another data packet information unit as specified by the previously transmitted header packet information unit. In either situation, initiator 110 correctly processes the next information unit, and data continues to stream across SCSI bus 150 even when the SCSI target must send a new header packet information unit.

Hence, according to the principles of this invention, upon completion of a data packet information unit transfer from one of SCSI targets 151 and 152, the phase of SCSI bus 150 is maintained in the Data In phase, and an auxiliary data streaming signal on line 160 in SCSI bus 150 has been initialized to indicate to initiator read streaming module 175 in initiator 110 whether the next information unit on SCSI bus 150 is a header packet information unit or a data packet information unit. In this way, initiator 110 can distinguish between header packet information units and data packet information units while the SCSI bus phase remains unchanged. Consequently, this invention further extends the Packetized SCSI Protocol to include data streaming from a SCSI target to a SCSI initiator while the SCSI bus remains in the Data In phase of the Packetized SCSI protocol.

In another embodiment, the data-streaming signal on line 160 is used to enhance flow control on host system I/O bus 101 and to enhance the performance of initiator 110 when data is being written to a SCSI target by SCSI initiator using the Packetized SCSI Protocol.

In one embodiment, as explained more completely below, in a Packetized SCSI write data transfer, e.g., a data transfer from a SCSI initiator 110 to one of SCSI devices 151 to 152 that is the SCSI target, the SCSI target asserts one of an active and an inactive data streaming signal on a line 160 of SCSI bus 150 during the transfer of a data packet information unit by initiator 110, e.g., prior to the assertion of a request signal REQ by the target device. Consequently, when initiator 110 transmits a portion of the complete data packet information unit and the SCSI bus phase remains Data Out, initiator 110 samples the data streaming signal on line 160 to determine whether the target has indicated that the target is ready to receive another data packet information unit.

If the target indicates that the target is ready to receive another data packet information unit, initiator prefetches data from host system 100 over host I/O bus 101. Conversely, if the target is not ready to receive another data packet information unit, e.g., the target's buffers are full, initiator 110 does not prefetch data from host system 100. Consequently, initiator 110 utilizes host system I/O bus 101 more efficiently than in the prior art because initiator 110 only prefetches data when the data can be utilized. Also, initiator 110 has an advance warning that the SCSI target will not accept further data packet information units at this, and so can take any required actions more quickly. This enhances the flow control of initiator 110.

Hence, according to the principles of this invention, upon completion of a portion of a data packet information unit transfer to one of SCSI devices 151 and 152 by initiator 110, the phase of SCSI bus 150 is maintained in the Data Out phase, and an auxiliary data streaming signal on line 160 in SCSI bus 150 has been initialized to indicate to initiator 110 whether the SCSI target is ready to receive another data packet information unit. In this way, initiator 110 can determine whether to prefetch additional data from a host system, or whether to take over actions to improve the performance of initiator 110. Consequently, this invention further extends the Packetized SCSI Protocol to include better utilization of host I/O bus 101 and utilization of initiator 110 while streaming data to a SCSI target from a SCSI initiator while the SCSI bus remains in the Data Out phase.

Figure 2A:
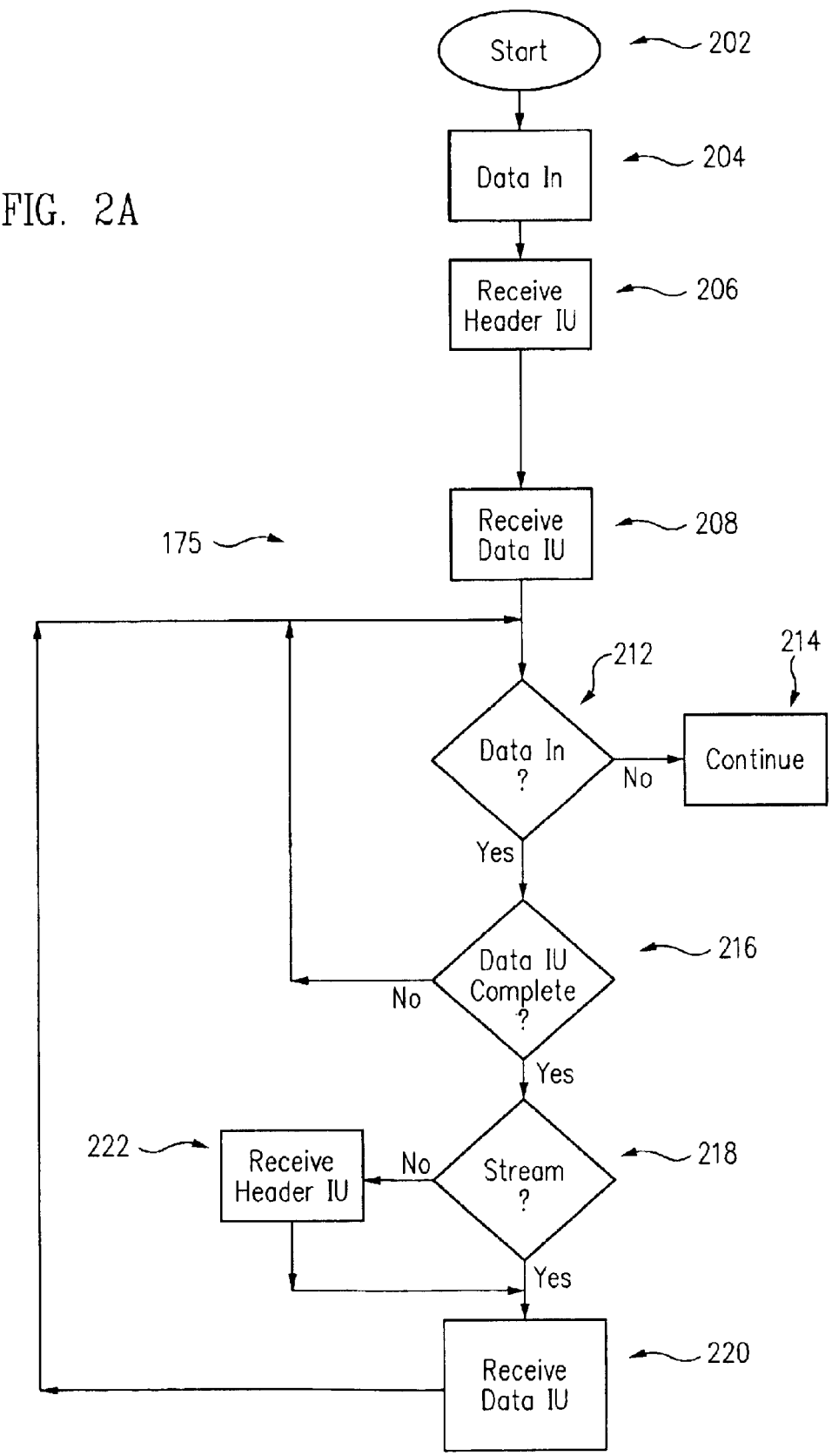
FIG. 2A is one embodiment of a process flow diagram for data streaming in a Data In phase of the Packetized SCSI Protocol that is performed by a SCSI initiator, and that is implemented in a target read streaming module according to the principles of this invention.

FIG. 2A is a process flow diagram for one embodiment of the operations performed by initiator read streaming module 175 in SCSI initiator 110, which typically is a host adapter integrated circuit. Herein, only the operations in the Packetized SCSI Protocol needed to understand the invention are described. The Packetized SCSI Protocol is well known to those of skill in the art and is described for example in "Information Technology-SCSI Parallel Interface-3(SPI-3)," T10 Project 1302D, Rev. 13a, American National Standards Institute, New York, N.Y., Jan. 12, 2000, which is incorporated herein by reference as an example of the level of skill in the art.

Figure 2B:
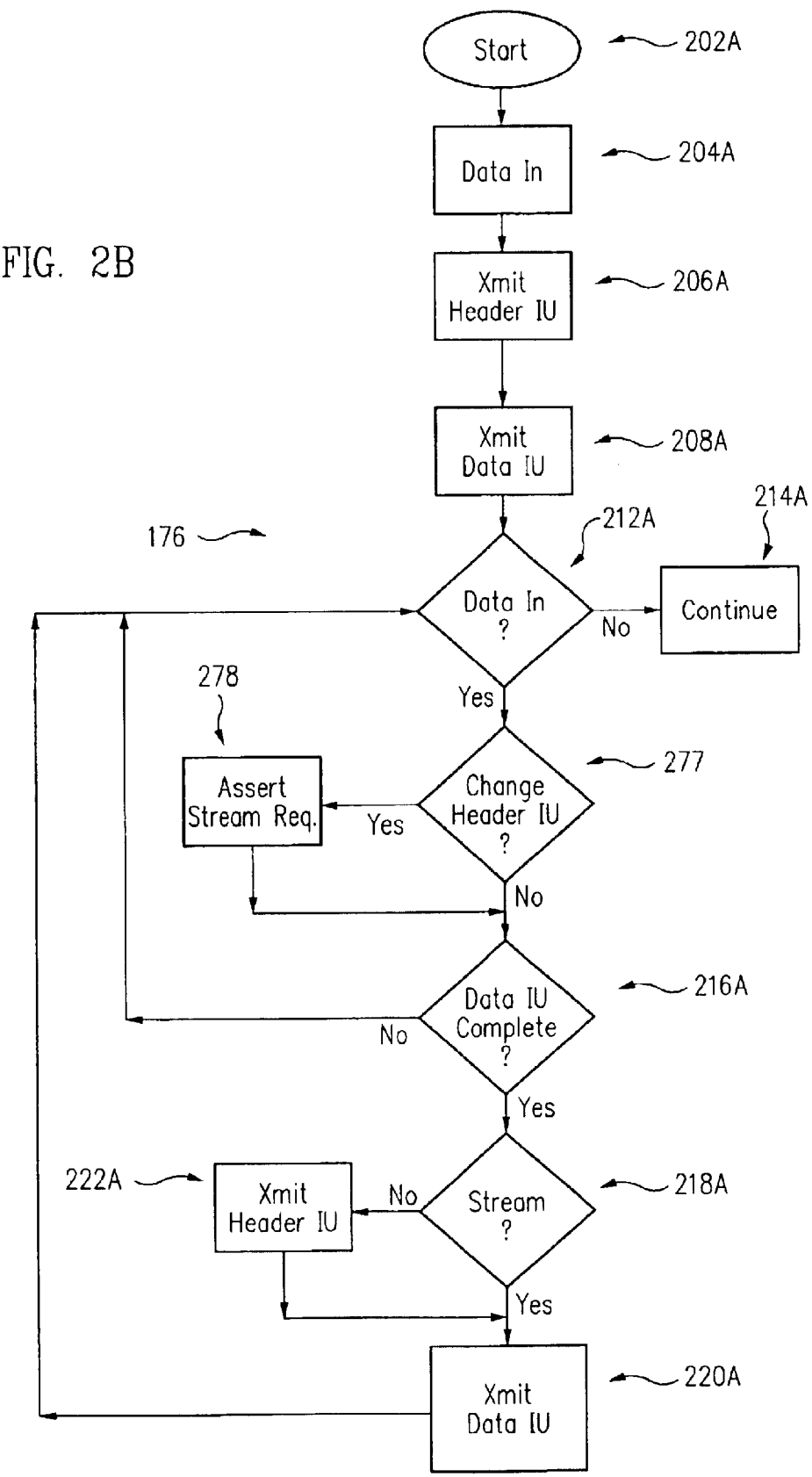
FIG. 2B is one embodiment of a process flow diagram for data streaming in a Data In phase of the Packetized SCSI Protocol that is performed by a SCSI target, and that is implemented in an initiator read streaming module according to the principles of this invention.

FIG. 2B illustrates a process flow diagram for the operations performed by target read streaming module 176 in target 151. Operations in FIG. 2B that are complementary to operations in FIG. 2A have the same numeric reference number and an added "A." In FIGS. 2A and 2B, the parts of the Packetized SCSI Protocol necessary to configure SCSI initiator 110 and SCSI target 151 for a read operation have been performed prior to start operation 202 when SCSI target 151 enters data in operation 204A and changes the SCSI bus phase to Data In. When the SCSI bus is in a particular phase, the initiator and target are also said to be in that particular phase. In initiator 110, data in operation 204 transfers to receive header IU operation 206.

As previously described upon SCSI target 151 configuring SCSI bus 150 for the Data In phase in data in operation 204A, SCSI target 151 transmits a header packet information unit, in transmit header IU operation 206A, to initiator 110. Consequently, in receive header IU operation 206, read streaming module 175 receives the header packet information unit and configures initiator 110 to receive a data packet information unit from target 151 and transfers to receive data IU operation 208.

Again, as described above, according to the Packetized SCSI Protocol, after target 151 transmits the header packet information unit, target 151 transmits the data packet information unit described in the header packet information unit in transmit data IU operation 208A. Hence, in receive data IU operation 208, initiator 110 receives the data packet information unit from target 151.

If the phase of SCSI bus 150 changes before the complete data packet information unit is received by initiator 110, initiator 110 continues according to the Packetized SCSI Protocol. This is represented in FIG. 2A by data in check operation 212, which transfers to continue operation 214 if the phase of SCSI bus 150 is other than Data In, and otherwise to data IU complete check operation 216.

If initiator 110 has received a complete data packet information unit, check operation 216 transfers to stream check operation 218 and otherwise returns to data in check operation 212. Operations 212 and 216 are not intended to indicate that initiator 110 continually polls the SCSI bus phase and the completion status of the data transfer, although this could be done. Rather, in this invention, two events are of interest, the phase of the SCSI bus, and the completion status of the data packet information unit transfer. When either event happens, initiator 110 takes the indicated action. Otherwise, initiator 110 continues to receive data from target 151. Operations 212 and 216, thus, show the actions taken when either event occurs. The particular way these operations are implemented is not essential to this invention.

In this embodiment, target 151 determines in change head IU check operation 277 (FIG. 2B) whether target 151 can use the header packet information previously transmitted to initiator 110, or whether target 151 needs to transmit a new header packet information unit to initiator 110. Typically, target 151 transmits a new header packet information unit if the available buffer space changes so that a change in the size of the data packet information unit transmitted is changed.

If a new header packet information unit must be transmitted, check operation transfers to assert streaming request operation 278, and otherwise to data IU complete check operation 216A. Again, as described above for initiator 110, SCSI target 151 typically does not continuously loop through operations 212A, 277, and 216A, but rather acts upon specific events. The comments above concerning operations 212 and 216 for initiator 110 are incorporated herein by reference for SCSI target 151. If buffer space becomes available before completion of transmission of the data packet information unit, check operation 277 is performed.

In one embodiment of assert streaming request operation 278, an active auxiliary data streaming signal is driven on line 160, i.e., an active signal is generated, to signal initiator 110 that a new header packet information unit will be sent upon completion of the data packet information unit transmission. Conversely, if the old header packet information unit is to be used by initiator 110, the auxiliary data-streaming signal on line 160 is held inactive by target 151 so that in either situation, target 151 generates a signal on line 160. In this embodiment, line 160 is the first parity line, i.e., line P0, in SCSI bus 150. Line P0 is not utilized by the Packetized SCSI Protocol and so is available for use by this invention.

When SCSI target 151 completes transmission of the data packet information unit, check operation 216A (FIG. 2B) transfers to streaming check operation 218A. If the auxiliary data streaming signal is inactive, check operation 216A transfers to transmit data IU operation 220A that in turn initiates transfer of another data packet information unit on SCSI bus 150. Conversely, if the auxiliary data-streaming signal is active, check operation 216A transfers to transmit header IU operation 222A that in turn initiates transfer of another header packet information unit on SCSI bus 150 and then transfers to transmit data IU operation 220A.

When initiator 110 receives the complete data packet information unit, check operation 216 (FIG. 2A) transfers to streaming check operation 218 with the SCSI bus phase being the Data In phase. Initiator 110 determines the signal level on line 160 in check operation 218. If the signal level indicates that another header packet information unit is going to be transmitted by SCSI target 151, e.g., the signal level is active in this embodiment, check operation transfers to receive header IU operation 222, and otherwise to receive data IU operation 220.

In receive header IU operation 222, initiator 110 receives another header packet information unit while SCSI bus 150 remains in the Data In phase. Upon receipt of the header packet information unit, operation 222 transfers to operation 220, which configures initiator 110 to receive the data packet information unit for the new header packet and then transfers to operations 212 through 218, which are repeated as appropriate.

If check operation 218 simply transfers to receive data IU operation 220, initiator 110 is configured to receive another data packet information unit that is defined by the header packet information unit already received. Operation 220 then transfers to operations 212 through 218, which are repeated as appropriate. If it is not necessary to change the header data packet information unit, this process results in a plurality of data packet information units being transmitted one after another.

Hence, the use of the auxiliary data streaming signal permits streaming during a Data In phase, e.g., a read operation, and more importantly permits streaming data packets having different characteristics without leaving the Data In phase. Consequently, the performance of the Packetized SCSI Protocol is significantly enhanced.

Figure 3A:
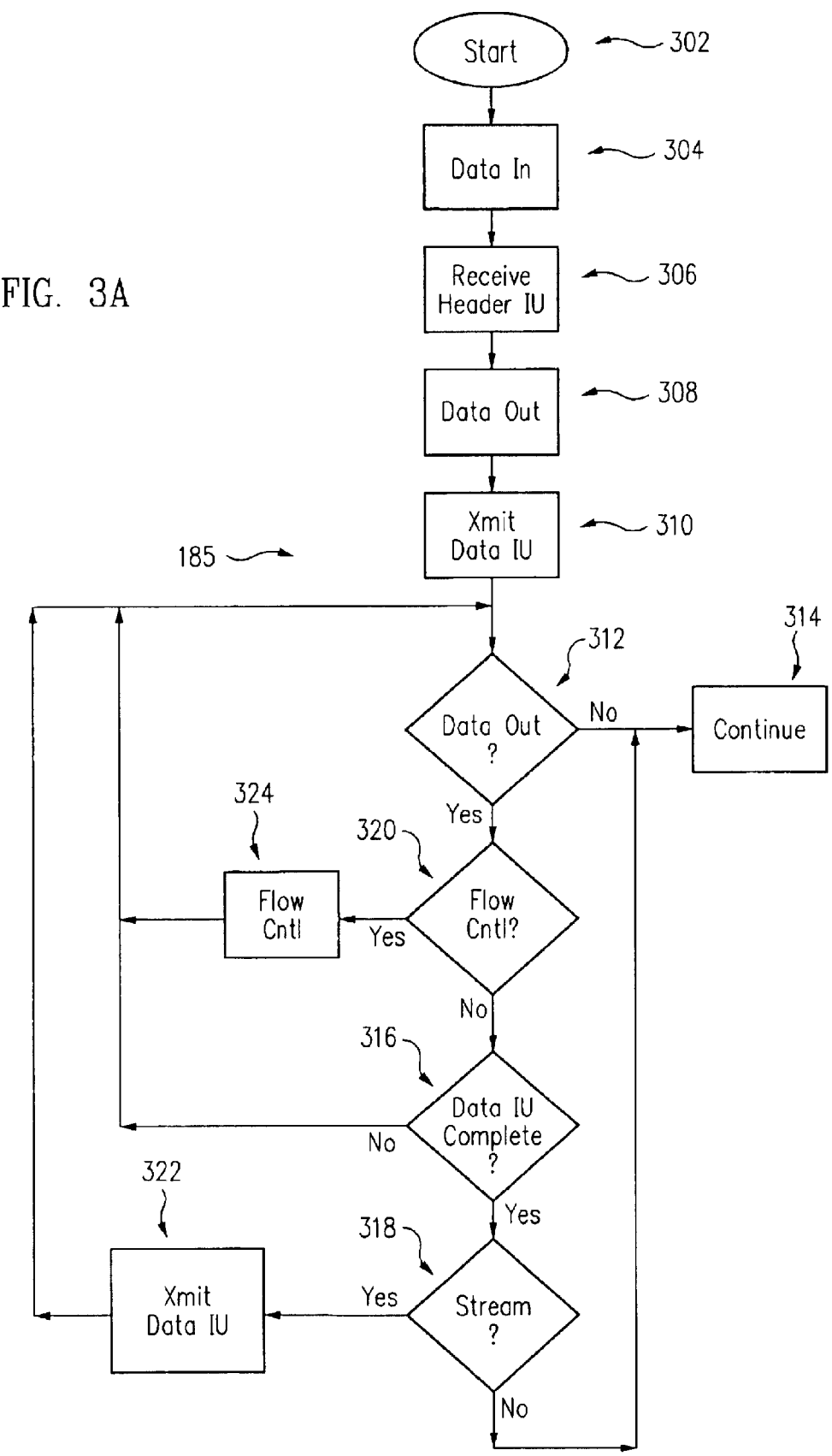
FIG. 3A is one embodiment of a process flow diagram for flow control in a Data Out phase of the Packetized SCSI Protocol that is performed by a SCSI initiator, and that is implemented in a target flow control module according to the principles of this invention.
Figure 3B:
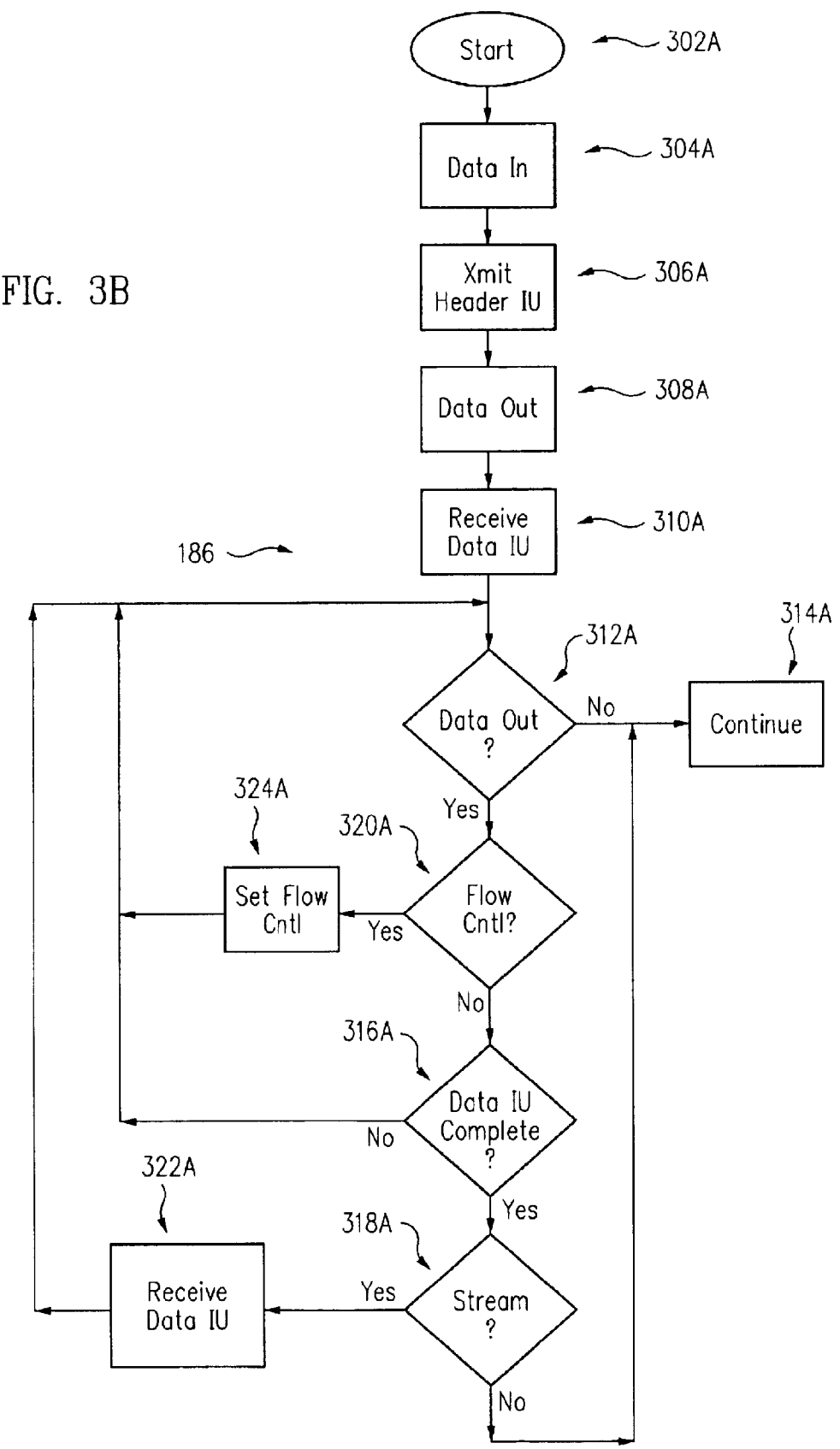
FIG. 3B is one embodiment of a process flow diagram for flow control in a Data Out phase of the Packetized SCSI Protocol that is performed by a SCSI target, and that is implemented in an initiator flow control module according to the principles of this invention.

In another embodiment of this invention, streaming from an initiator to a target using the Packetized SCSI Protocol is further enhanced by the target providing flow control information to the initiator, which the initiator in turn uses to utilize the host system I/O bus more efficiently and/or to utilize resources of the initiator more efficiently. FIG. 3A is a process flow diagram for one embodiment of the operations performed by an initiator flow control module 185 in SCSI initiator 110, which typically is a host adapter integrated circuit. FIG. 3B illustrates a process flow diagram for the operations performed by flow control module 186 in target 151. Operations in FIG. 3B that are complementary to operations in FIG. 3A have the same numeric reference number and an added "A." Herein, only the operations in the Packetized SCSI Protocol needed to understand the invention are described. As indicated above, the Packetized SCSI Protocol is well known to those of skill.

In FIGS. 3A and 3B, the parts of the Packetized SCSI Protocol necessary to configure SCSI initiator 110 and SCSI target 151 for a write operation have been performed prior to start operation 302 when SCSI target 151 enters data in operation 304A and changes the SCSI bus phase to Data In. In initiator 110, data in operation 304 transfers to receive header IU operation 306.

As previously described upon SCSI target 151 configuring SCSI bus 150 in the Data In phase in data in operation 304A, SCSI target 151 transmits a header packet information unit, in transmit header IU operation 306A, to initiator 110. Upon completion of transmitting the header packet information unit, processing transfers to data out operation 308A in which the SCSI bus phase is changed to Data Out.

In receive header IU operation 306, control flow module 185 receives the header packet information unit and configures initiator 110 to transmit a data packet information unit to target 151 and transfers to transmit data IU operation 310. If the phase of SCSI bus 150 changes before the complete data packet information unit is transmitted by initiator 110, initiator 110 continues according to the Packetized SCSI Protocol. This is represented in FIG. 3A by data out check operation 312, which transfers to continue operation 314 if the phase of SCSI bus 150 is other than Data Out, and otherwise to data IU complete check operation 316.

After changing the phase of SCSI bus 150 to Data Out, target flow control module 186 transitions to receive data IU operation 310A in which target 151 is configured to receive the data packet information unit from initiator 110. After initiating receipt of the data packet information unit in receive data IU operation 310A, target 151 transfers to data out check operation 312A.

If the phase of SCSI bus 150 changes before the complete data packet information unit is received by target 151, target 151 also continues according to the Packetized SCSI Protocol. This is represented in FIG. 3B by data out check operation 312A, which transfers to continue operation 314A if the phase of SCSI bus 150 is other than Data Out, and otherwise to flow control check operation 320A. If target 151 determines that target 151 is going to discontinue data streaming from initiator 110 upon receipt of the complete current data packet information unit, target flow control module 186 transfers processing to set flow control operation 324A, which in turn asserts an active flow control signal on line 160 of SCSI bus 150 and transfers to data out check operation 312A. In this embodiment, line 160 also is the first parity line, i.e., line P0, in SCSI bus 150.

Conversely, if target 151 is going to continue data streaming from initiator after receipt of the current data packet information unit, flow control check operation transfers to data IU complete check operation 316A. In this case, the flow control signal on line 160 remains inactive. If target has received a complete data packet information unit, check operation 316A transfers to stream check operation 318A and otherwise to data out check operation 312A.

Operations 312A, 320A and 316A, as presented in FIG. 3B, are not intended to indicate that target continually polls the SCSI bus phase in operation 312A, polls to determine whether to initiate flow control in operation 320A, and polls the completion status of the data transfer in operation 316A, although this could be done. In particular, SCSI target 151 typically does not continuously loop through operations 312A, 320A, and 316A, but rather acts upon specific events. In this embodiment of the invention, three events are of interest, the phase of the SCSI bus, whether to assert the flow control signal, and the completion status of the data packet information unit transfer. When any one of these events happens, target 151 takes the indicated action. Otherwise, target 151 continues to receive data from initiator 110.

Operations 312A, 320A and 316A, thus, show the actions taken when the described event occurs. The particular way these operations are implemented is not essential to this invention. The important aspect is that target 151 signals initiator 110 whether to prefetch data from host system 100 while receiving the data packet information unit.

Returning to the operation of initiator flow control module 185 (FIG. 3A), after initiating transmission of the data packet information unit in transmit data IU operation 310, initiator 110 transfers to data out check operation 312.

If the phase of SCSI bus 150 changes before the complete data packet information unit is transmitted by initiator 110, initiator also continues according to the Packetized SCSI Protocol. This is represented in FIG. 3A by data out check operation 312, which transfers to continue operation 314 if the phase of SCSI bus 150 is other than Data Out, and otherwise to flow control check operation 320. If target 151 asserted the signal on line 160, operation 320 transfers to data IU complete check operation 316 and otherwise to flow control operation 324.

In one embodiment in flow control operation 324, initiator 110 prefetches data over I/O bus 101 from host system 100 so that initiator 110 can continue to steam data to target 151. Conversely, if target 151 has driven an active signal on line 160, initiator 110 does not prefetch data from host system 100. Consequently, data is prefetched only if the data can be streamed to the target.

In another embodiment in flow control operation 324, if target 151 has driven an active signal on line 160, initiator 110 can prepare for the end of this data transmission and any subsequent action.

For this process to completely eliminate unnecessary prefetching, target 151 must make the determination upon whether to continue data streaming as early as possible. For example, if the length of the data path through initiator 110 is one Kbyte, preferably, target 151 asserts the signal on line 160 prior to initiating the sequence of request signals REQs on bus 150 to transfer the last one Kbyte of the current data packet information unit. However, even if target 151 asserts the signal to indicate that data streaming is to be discontinued after the current data packet information unit sometime before receipt of the complete data packet information unit, initiator 100 prefetches less data than in the prior art, and so this invention still improves host I/O bus utilization relative to the prior art that did not discontinue prefetching data until the SCSI bus phase changed from Data Out.

The circuitry for configuring the SCSI bus phases, and for transmitting and receiving information unit according to the Packetized SCSI Protocol is similar to that used in the prior art, and so is not considered further. The control and reading of the signal level on line 160 is preferably done using a hardware circuit. If a target utilizes state machines to perform the Packetized SCSI Protocol, the state machines are changed to include the additional operations shown in the Figures to implement the features of this invention. The particular hardware circuitry used to drive and read the signal levels on line 160 is not essential to this invention so long as the circuitry provides the signal levels as described herein.

This application is related to the following copending, commonly filed, and commonly assigned U.S. Patent Applications, each of which is incorporated herein by reference in its entirety:

1. U.S. patent application Ser. No. 09/745,105, entitled "A METHOD AND STRUCTURE FOR SUPPORTING DATA STREAMING BY A SCSI TARGET DURING THE DATA IN PHASE OF THE PACKETIZED SCSI PROTOCOL," of B. Arlen Young filed on Dec. 20, 2000;

2. U.S. patent application Ser. No. 09/745,106, entitled "A METHOD AND STRUCTURE FOR SUPPORTING DATA STREAMING BY A SCSI INITIATOR DURING THE DATA IN PHASE OF THE PACKETIZED SCSI PROTOCOL," of B. Arlen Young filed on Dec. 20, 2000;

3. U.S. patent application Ser. No. 09/745,036, entitled "A METHOD AND STRUCTURE FOR SUPPORTING FLOW CONTROL BY A SCSI TARGET DURING THE DATA OUT PHASE OF THE PACKETIZED SCSI PROTOCOL," of B. Arlen Young filed on Dec. 20, 2000;

4. U.S. patent application Ser. No. 09/745,035, entitled "A METHOD AND STRUCTURE FOR SUPPORTING FLOW CONTROL BY A SCSI INITIATOR DURING THE DATA OUT PHASE OF THE PACKETIZED SCSI PROTOCOL," of B. Arlen Young filed on Dec. 20, 2000; and 5. U.S. patent application Ser. No. 09/745,034, entitled "A METHOD AND SYSTEM FOR FLOW CONTROL DURING THE DATA OUT PHASE OF THE PACKETIZED SCSI PROTOCOL," of B. Arlen Young filed on Dec. 20, 2000.

I claim:

1. A method for data streaming by a SCSI system using a Packetized SCSI Protocol, said method comprising:

transferring a data packet information unit in a Packetized SCSI Protocol Data In phase between a SCSI target and a SCSI initiator over a SCSI bus; and generating a signal on said SCSI bus by said SCSI target in said Packetized SCSI Protocol Data In phase to indicate whether a header packet information unit or another data packet information unit is to be transmitted next in said Packetized SCSI Protocol Data In phase to said SCSI initiator.

2. The method of claim 1 wherein said generating a signal further comprises:

generating a said signal on a parity signal line of said SCSI bus.

3. The method of claim 1 further comprising:

transferring said header packet information unit in said Packetized SCSI Protocol Data In phase from said SCSI target and to said SCSI initiator over said SCSI bus following said generating a signal indicating said header packet information unit is to be transmitted next.

4. The method of claim 1 further comprising:

transferring said another data packet information unit in said Packetized SCSI Protocol Data In phase from said SCSI target and to said SCSI initiator over said SCSI bus following said generating a signal indicating said another data packet information unit is to be transmitted next.

5. A method comprising:

transferring a header packet information unit from a SCSI target to a SCSI initiator in a Packetized SCSI Protocol Data In phase; and transferring a plurality of data packet information units, one immediately after another, from said SCSI target to said SCSI initiator in said Packetized SCSI Protocol Data In phase.

6. The method of claim 5 further comprising:

generating a signal on a SCSI bus line by said SCSI target during said Packetized SCSI Protocol Data In phase to indicate transmission of another header packet information unit in said Packetized SCSI Protocol Data In phase to said SCSI initiator.

7. The method of claim 6 wherein said SCSI bus line is a parity signal line.

8. The method of claim 6 further comprising:

transferring said another header packet information unit from said SCSI target to said SCSI initiator in said Packetized SCSI Protocol Data In phase following said generating said signal.

9. The method of claim 8 further comprising:

transferring another data packet information unit from said SCSI target to said SCSI initiator in said Packetized SCSI Protocol Data In phase following said transferring said another header packet information unit.

10. A SCSI system comprising:

a SCSI bus;

a SCSI target connected to said SCSI bus, said SCSI target comprising a target read streaming module configured to perform a method comprising:

transmitting a data packet information unit over said SCSI bus in a Packetized SCSI Protocol Data In phase; and generating a streaming signal on said SCSI bus during said Packetized SCSI Protocol Data In phase to indicate whether a header packet information unit or another data packet information unit is to be transmitted next in said Packetized SCSI Protocol Data In phase; and a SCSI initiator connected to said SCSI bus, said SCSI initiator comprising an initiator read streaming module configured to perform a method comprising:

receiving said data packet information-unit from said SCSI bus in said Packetized SCSI Protocol Data In phase;

receiving said streaming signal on said SCSI bus in said Packetized SCSI Protocol Data In phase indicating whether a header packet information unit or another data packet information unit is to be received next in said Packetized SCSI Protocol Data In phase; and interpreting an asserted streaming signal to indicate said header packet information unit is to be received next in said Packetized SCSI Protocol Data In phase.

11. The SCSI system of claim 10 wherein said streaming signal is carried on a parity signal line of said SCSI bus.

* * * * *